United States Patent Office 3,440,222
Patented Apr. 22, 1969

3,440,222
FLAME RESISTANT PHOSPHORAMIDATE-
POLYESTER REACTION PRODUCTS
Edward N. Walsh, Thornwood, N.Y., and Eugene H.
Uhing, Ridgewood, N.J., assignors to Stauffer Chemical
Company, New York, N.Y.
No Drawing. Continuation-in-part of application Ser. No.
292,117, July 1, 1963. This application July 19, 1966,
Ser. No. 566,260
Int. Cl. C08g *41/02;* C09k *3/28*
U.S. Cl. 260—75                                   4 Claims

ABSTRACT OF THE DISCLOSURE

Flame resistant polyester resins comprising the reaction product of an aliphatic unsaturated polycarboxylic acid and an O,O-dihydrocarbyl N,N-bis-(hydroxyalkyl) phosphoramidate having the formula:

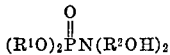

wherein $R^1$ is a hydrocarbyl radical selected from the class consisting of alkyl and aryl, and $R^2$ is a lower alkylene radical.

---

This application is a continuation-in-part of application Ser. No. 292,117, filed July 1, 1963, now abandoned.

This invention relates to novel polyester reaction products which are prepared by the reaction of certain hydroxyalkyl phosphoramidates and polybasic acids. In particular, this invention relates to the use of O,O-dihydrocarbyl N,N-bis-(hydroxyalkyl) phosphoramidates in the preparation of flame resistant polyesters.

In the past, selected phosphorus containing compounds have been found to be useful in rendering flame-resistant materials such as polyurethane foams. For example, U.S. Patent 3,076,010 discloses certain dialkyl dialkanol aminoalkyl phosphoramidates which can be copolymerized with isocyanate compounds to render the resulting composition flame-resistant. It is also well known that it is extremely difficult and in many cases impossible to predict whether a given class of phosphorus containing compounds will impart the desired properties to the resulting product, substantial research and testing being required in order to discover which of the vast number of phosphorus containing compounds are suitable for this purpose. However, one basis for selection of suitable phosphorus containing compounds is the hydrolytic stability of the compound. For example, the aminoalkylphosphonates disclosed in the above-mentioned patent have a P—C—N type bond which exhibits very high hydrolytic stability in acid solution; and the reaction products of such aminoalkylphosphonates and polyisocyanates are known to exhibit excellent flame retardancy as well as hydrolytic and dimensional stability. On the other hand, it is known that the P—N type bond such as is present in the phosphoramidate polyols is readily cleaved in acid solution. See J. Org. Chem. 23, 1889 (1958). A report published in Compt. rend. 250, 2377 (1960) and in Chem. Review 64, 328 (1964) shows appreciable hydrolysis of phosphoramidate esters in acid solution indicating that the N—P bond is actually less stable than the O—P bond. By way of comparison, the P—C—N bond present in the aminoalkylphosphonates of the above-identified patent are known to be more stable than the O—P bond toward acid hydrolylis. It is further known that triamides of phosphoric acid are readily hydroyzed in acid solution giving further evidence of the hydrolytic instability of the P—N bond. See Trans. Faraday Soc. 47, 1093 (1951). For these reasons one skilled in the art would not expect that phosphoramidate polyols would react either with isocyanates or polyesters to produce a stable, flame resistant product.

Surprisingly, however, we have now found that the phosphoramidate polyol compounds, formulistically represented below, can be reacted with polybasic acids to produce stable flame resistant polyesters:

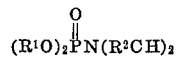

wherein $R^1$ is a hydrocarbyl radical which may be either alkyl of aryl, and $R^2$ is a lower alkylene radical. The phosphoramidates can be prepared by one of the following equations:

(I)
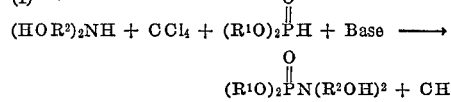

(II)
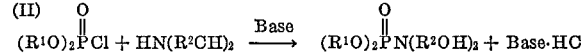

Suitable organic radicals which may be used in the $R^1$ portion of the molecule include methyl, ethyl, propyl, isopropyl, butyl, amyl, octyl, 2-chloroethyl, 2-bromoethyl, phenyl, cresyl, chlorophenyl, polyhalophenyl, etc. These two $R^1$ groups, which are attached to the phosphorus atom through oxygen, may be the same radical, or mixed esters such as methyl, ethyl; propyl, butyl; or methyl, octyl may be used.

Suitable alkanolamines which may be used in preparing these compounds include di-ethanol amine, di-propanol amine, ethanol propanol amine, di-butanol amine, di-octanol amine, etc. It is also within the scope of this invention to use mixed alkanol amines in the preparation of these compounds. The following examples illustrate the preparation of compounds which are suitable for preparing the reaction products of the present invention.

EXAMPLE 1

Preparation of O,O-diethyl N,N-bis-(2-hydroxyethyl) phosphoramidate

To 138 grams of diethyl phosphite dissolved in 300 ml. of carbon tetrachloride was added 106 grams of diethanol amine, while stirring at 0° C. The reaction flask was equipped with a thermometer and dropping funnel. Triethyl amine, 103 grams, was then added dropwise while stirring the reaction mixture at 0–5° C. The stirring was continued for one hour after the addition and subsequently a solution of 40.5 grams of sodium hydroxide in 40 ml. of water was added dropwise. The temperature was maintained at 0–5° C. throughout the addition. The reaction mixture was then gradually warmed to 10–20° C. and the pressure was reduced to remove the solvent, water, triethyl amine, and the by-product chloroform by distillation. The residue at 20° C. under 3 mm. pressure was heated for one hour at 70° C. to remove the last traces of volatile contaminants. The resulting viscous suspension was treated with 300 ml. of chloroform and filtered to remove the by-product, sodium chloride. After reconcentrating the filtrate to 70° C. at 1 mm. pressure, a viscous, clear oil was isolated. Yield: 240 grams (99% of theory). Analysis calculated: P, 12.9; N, 5.8; OH, 14.1. Found: P, 13.2; N, 6.2; OH, 14.8.

EXAMPLE 2

Preparation of O,O-dipropyl N,N-bis-(2-hydroxyethyl) phosphoramidate

To a solution of 83 grams of di-n-propyl phosphite in 400 grams of carbon tetrachloride was added 52.5 grams of diethanol amine, while stirring the reaction mixture at −5° C. Triethyl amine, 50.5 grams, was then added, while stirring at —5° C. Consequently, a solution of 20 grams of sodium hydroxide in 20 ml. of water was added dropwise at 0° C. The reaction mixture was then concentrated under reduced pressure to 10° C. at 1–3 mm. The residue was dissolved in 300 ml. of acetone and the sodium chloride was removed by filtration. The filtrate was concentrated to and held at 60° C. under 0.3 mm. pressure to remove the last traces of volatiles. The residue, a viscous oil, was collected. Yield: 133.0 grams (99% of theory); $N_D^{25}$, 1.4567. Analysis calculated: P, 11.5; N, 5.2; OH, 12.6. Found: P, 11.6; N, 5.1; OH, 12.4.

EXAMPLE 3

Preparation of O,O-bis-(2-choroethyl) N,N-bis-(2-hydroxyethyl) phosphoramidate

To a solution of 83 grams of bis-(2-chloroethyl) phosphite in 300 grams of carbontetrachloride was added 42 grams of diethanol amine while stirring at 0° C. Triethylamine, 40.5 grams, was then added at below 5° C. The reaction mixture was maintained at below 5° C. while stirring for one hour longer and then 32 grams of 50% sodium hydroxide was added at 0–5° C. The volatile components were removed by distillation under reduced pressure, the residue at 0° C. under 1–3 mm. pressure was dissolved in 300 ml. of acetone and filtered to remove sodium chloride. The filtrate was reconcentrated and the residue was held at 50–60° C. under 1 mm. pressure for 1 hour. Yield: 123.5 grams (99.5% of theory). Analysis calculated: P, 10.0; N, 4.5; Cl, 22.9; OH, 10.9. Found: P, 10.7; N, 4.3; Cl, 22.2; OH, 9.0.

EXAMPLE 4

Preparation of O,O-dimethyl N,N-bis-(2-hydroxyethyl) phosphoramidate

A solution of 82.5 grams of dimethyl phosphite in 400 ml. of carbontetrachloride was treated dropwise, while stirring at 0–5° C. with 78.5 grams of diethanol amine. Triethyl amine, 76.0 grams, was then added under similar conditons. The reaction mixture was stirred for one hour longer at 5–10° C. and then a solution of 30 grams of sodium hydroxide in 35 ml. of water was added while stirring at 5° C. Sodium sulfate, 44 grams, was added to absorb the water, and after stirring for thirty minutes the liquid organic phase was decanted from the inorganic precipitate. The organic phase was concentrated by distillation under reduced pressure, and the residue was held at 60° C. under 0.5 mm pressure for 30 minutes longer. A filtration removed the last particles of inorganic salts. Yield: 154.7 grams (94%); $N_D^{25}$, 1.4612. Analysis calculated: P, 14.6; N, 6.6; OH, 16.0. Found: P, 14.1; N, 6.3; OH, 16.0.

EXAMPLE 5

Preparation of O,O-diphenyl N,N-bis-(2-hydroxyethyl) phosphoramidate

Into a 500 ml. reaction flask equipped with stirrer and dropping funnel was placed 46.8 grams of diphenyl phosphite (0.2 mole) and 100 ml. $CCl_4$. To this mixture was added 21.0 grams of diethanolamine (0.2 mole) dropwise at 0–5° C. Then 22.0 grams of triethylamine was added dropwise. The reaction mixture was warmed to 40° C. for five minutes and after cooling, 8.2 grams of sodium hydroxide dissolved in 15 ml. of water was added. The reaction was stripped of solvents following which 100 ml. of acetone was added and the reaction was filtered to remove sodium chloride. The acetone was removed from the product by distilling under vacuum. The yield was 64.5 grams (95.7%) of $(C_6H_5O)_2P(O)$ $NCH_2CH_2OH)_2$. This product analyzed as 8.1% P and 4.4% N (theory, 9.1% P; 4.15% N).

The phosphoramidate products of the present invention have been found to have valuable properties in providing flame resistance for polyurethane foam formulations as well as polyesters. The phosphoramidates may be used individually or, alternatively, we have also found that various mixtures of these new compounds provide excellent flame resistance. Due to the presence of the hydroxyl group in the alkanol amine portion of the molecule, these compounds actually react with the organic polyisocyanates and polyester resins to produce flame resistant reaction products. In this respect they may replace some or all of the polyol generally used in such formulations.

The production of urethane or isocyanate polymers is a well-known commercial process, see for instance Kirk-Othmer, The Encyclopedia of Chemical Technology, First Supplement, pp. 888 et seq. (Interscience, 1957). Briefly, this process involves the reaction of an organic polyisocyanate and a second compound which may contain an hydroxyl, amino or carboxy group, i.e., a compound containing active hydrogen. As used in this specification the term "organic polyisocyanate" is intended to include isocyanate or urethane compositions containing unreacted —NCO radicals.

The most common polymers are formed by the reaction of toluene diisocyanate (hereafter TDI) and a saturated polyester. (This latter compound may however, contain benzene unsaturation.) Representative polyesters for this purpose are the reaction products of adipic acid and/or phthalic anhydride and ethylene glycol. Other compounds which may be used in place of the polyesters are polyethers, simple glycols, polyglycols, castor oil, drying oils, etc. Whether the products are to be flexible or rigid depends upon the degree of cross-linking and thus the type of polyol which is used. Since the products of this invention may replace only a part of the polyol, they are thus suitable for use in either flexible or rigid foams.

When an expanded or foamed product is to be produced, it is the general practice to add water to the composition. The water reacts with the —NCO groups to release $CO_2$ and cause the expansion of the polymer into a foamed mass.

Control of this reaction requires considerable skill and often special equipment. In some cases it has been found advisable to use inert dissolved gases including the various halo-hydrocarbons such as the well known Freons or Genetrons. These low boiling liquids boil when warmed by the heat of reaction and thus cause foaming. They also serve to lower the thermal conductivity and increases the flame resistance of the resulting foam. The term "foaming agent" as used herein is intended to include both reactive materials such as water and inert materials such as halohydrocarbons which cause the copolymers to form an expanded foam.

In addition to the actual reactants and foaming agents it is also desirable in many cases to add a small amount of a surfactant in order to provide a more homogeneous mixture.

The following examples illustrate the use of the phosphoramidates in preparing flame resistant polyurethane foam products:

EXAMPLE 6

To 7.75 grams of O,O-diethyl-N,N-bis-(2-hydroxyethyl) phosphoramidate (Example 1) was added 5.77 grams of a polyolpolyether (see Note 1) having a hydroxyl number of 469 and 0.2 grams of tetramethyl guanidine. Freon 11, trichlorofluoromethane 4.9 grams, was then added, followed by 15.0 grams of a toluene diisocyanate material having a free —NCO content of 30.2% such as, e.g., Selectron 6505. These reagents were well mixed for fifteen seconds and allowed to stand at room temperature in a paper container. A mild exothermic reaction ensued, during which time the reaction mixture expanded to fill a volume in excess of 400 ml. A small piece of this foam burned slightly when held in a flame. It was immediately self-extinguishing when removed from the flame.

---

NOTE.—Polyol-polyether condensation product of sucrose and propylene oxide, e.g., Selectrofoam 6402.

EXAMPLE 7

In a manner similar to Example 6, a polyether polyurethane foam was prepared from 6.6 grams of O,O-bis-(2-chloroethyl) N,N-bis-(2-hydroxyethyl) phosphoramidate (Example 3), 9.0 grams of the polyether, 0.2 gram of tetramethyl guanidine, 4.95 grams of trichlorofluoromethane, and 15.0 grams of the above specified toluene diisocyanate material (Example 6). The reaction was rapid and the foam expanded to a volume in excess of 400 ml. The resulting hard foam resin was self-extinguishing.

EXAMPLE 8

In a manner similar to Example 6, the following mixture was prepared:

8.55 grams of O,O-di-n-propyl N,N-bis-(2-hydroxyethyl) phosphoramidate (Example 2)
5.58 grams polyol-polyether (see Note of Example 6).
0.20 gram tetramethyl guanidine
4.95 grams trichlorofluoromethane
15.00 grams toluene diisocyanate material specified in Example 6.

This material reacted quickly to yield a hard, self-extinguishing foam of volume in excess of 400 ml.

EXAMPLE 9

In a manner similar to Example 6, a hard self-extinguishing foam was prepared from the following mixture:

7.00 grams O,O-dimethyl N,N-bis-(2-hydroxyethyl) phosphoramidate (Example 4), 5.1 grams polyol-polyether (See Note 1 of Example 6), 0.2 gram tetramethyl guanidine, 4.95 grams trichlorofluoromethane, 15.0 grams toluene diisocyanate material specified in Example 6. The final volume of the foam exceeded 500 ml.

EXAMPLE 10

In a manner similar to Example 6, a foam was prepared using the above polyether and isocyanate material in the absence of the phosphoramidate component. A mixture was prepared as follows:

13.45 grams polyol-polyether (see Note of Example 6).
0.2 gram tetramethyl guanidine
4.95 grams trichlorofluoromethane
15.0 grams toluene diisocyanate material specified in Example 6.

A strong, hard foam was obtained within ten minutes which had a volume in excess of 400 ml. This foam burned completely when ignited and removed from a flame.

Following the procedure of Example 6, foams were prepared using the following mixtures:

EXAMPLE 11

5.5 grams, O,O-diethyl N,N-bis-(2-hydroxyethyl) phosphoramidate
5.88 grams polyoxypropylene sorbitol having a hydroxyl number about 600, e.g., Atlas G-2566.
0.2 gram tetramethyl guanidine
4.95 grams $CCl_3F$
15.0 grams polyisocyanate having a free —NCO content of 30.1%, e.g., Atlas G-2566.
0.05 gram silicone glycol copolymer surfactant. This surfactant at 77° F. has a viscosity of 350 centistokes at specific gravity of 1.07. It is water soluble, has 1.5% hydroxyl content and solidifies at 60° F. An example of this surfactant is Dow Corning DC-113.

This foam was self-extinguishing.

EXAMPLE 12

3.95 grams O,O-bis-(2-chloroethyl) N,N-bis-(2-hydroxyethyl) phosphoramidate
7.90 grams polyoxypropylene sorbitol specified in Example 11.
0.20 gram tetramethyl guanidine
4.95 grams $CCl_3F$
15.0 grams polyisocyanate specified in Example 11.
0.05 gram surfactant specified in Example 11.

This foam was self-extinguishing.

EXAMPLE 13

6.17 grams O,O-di-n-propyl N,N-bis-(2-hydroxyethyl) phosphoramidate
5.80 grams polyoxypropylene sorbitol specified in Example 11.
0.20 gram tetramethyl guanidine
4.95 grams $CCl_3F$
15.0 grams polyisocyanate specified in Example 11.
0.05 gram surfactant specified in Example 11.

This foam was self-extinguishing.

EXAMPLE 14

7.02 grams O,O-dimethyl N,N-bis-(2-hydroxyethyl) phosphoramidate
3.75 grams polyoxypropylene sorbitol specified in Example 11.
0.20 gram tetramethyl guanidine
4.95 grams $CCl_3F$
15.0 grams polyisocyanate specified in Example 11.
0.05 gram surfactant specified in Example 11.

This foam was self-extinguishing.

EXAMPLE 15

9.85 grams polyoxypropylene sorbitol specified in Example 11.
0.20 gram tetramethyl guanidine
4.95 grams $CCl_3F$
15.0 grams polyisocyanate specified in Example 11.
0.05 gram surfactant specified in Example 11.

This foam was not self-extinguishing.

The following examples illustrate the preparation of flame resistant reaction products of polybasic acids and phosphoramidates. The resulting resins are hard, self-extinguishing products as illustrated in the following examples:

EXAMPLE 16

O,O-diethyl, N,N-bis-(2-hydroxyethyl) phosphoramidate, 11.7 grams, and 22.5 grams of triethylene glycol were mixed with 19.6 grams of maleic anhydride and heated at 190° C. A total of 4.4 grams, mostly water produced during the reaction, was volatilized during this reaction to yield a resinous polymer. (Theoretical weight loss is 3.6 grams.) A sample of 7.26 grams of this prepolymer was mixed with 2.92 grams of styrene and 0.1 gram of benzoyl peroxide. The resulting mixture was heated at 80° C. for sixteen hours under an atmosphere of nitrogen. A clear, hard, self-extinguishing resin was obtained. A similar resin prepared without the use of the phosphoramidate burned completely when withdrawn from a flame.

EXAMPLE 17

A sample of 9.30 grams of the prepolymer described in Example 16 was mixed with 4.16 grams of styrene, 0.4 gram of O,O-diallyl chloromethylphosphonate, and 0.1 gram benzoyl peroxide. The mixture was heated for sixteen hours at 80° C. under a nitrogen atmosphere. A clear, hard resin was obtained which, when held in a flame until ignition and then removed, was found to be self-extinguishing.

The foregoing products obtained from the reaction of O,O-dihydrocarbyl N,N-(bis-hydroxyalkyl) phosphoramidates with certain di- or poly-functional carboxylic acids may be used for the preparation of films, laminates, adhesives, etc. The phosphorus compound may be incorporated with other glycols or polyols such as trimethylene glycol, sorbitol, glycerol, etc., which mixtures, when condensed with certain carboxylic acid compounds to form polyester resins, have a wide variety of physical properties. When the formulation contains non-aromatic unsaturated groups, as in the case when maleic acid or similar unsaturated carboxylic acids are used in the formulation, the resulting resin may be caused to react further with vinyl-containing compounds, such as styrene, methyl acrylate, or O,O-diallyl chloromethylphosphonate, in the presence of suitable free radical initiators, such as benzoyl peroxide to form clear, hard, cross-linked resins.

In particular, three groups of compounds which may be used to prepare suitable polyesters for this invention are as follows: (1) acids such as maleic, fumaric, itaconic, phthalic and the like; (2) alcohols or glycols such as allyl, alcohol, ethylene glycol and diethylene glycol; (3) hydrocarbons containing aliphatic unsaturation such as styrene, cyclopentadiene and the like as cross-linking agents. For example, the polyesters disclosed in U.S. Patent No. 2,255,313 are illustrative of these unsaturated polyesters. Also polyesters such as generally described in U.S. Patent 2,443,736, containing an alkenyl aryl cross-linking agent, such as diallyl phthalate, and the reaction product of an alpha, beta ethylenically unsaturated polycarboxylic acid, such as maleic or fumaric acid, a saturated polycarboxylic acid free of non-benzoid unsaturation, such as phthalic acid, and at least one glycol, such as ethylene glycol and/or diethylene glycol.

In the foregoing examples, in order to compare the flame resistance of the formed products, ¾" x ¾" x 3" pieces of the foams were suspended vertically and ignited with a Bunsen burner. The phosphorus-free foams ignited readily and generally burned completely. The foams containing the O,O-dihydrocarbyl N,N-bis (hydroxyalkyl) phosphoramidate were difficult to ignite and generally self-extinguishing when removed from the flame.

In performing the foregoing examples, ordinary commercial grade materials have been used. These commercial compounds are readily available in most instances. This is particularly true of the alkanolamines, carbon-tetrachloride and dialkyl phosphates used. In formulating the urethane foams we have used a number of commercially available polyesters, polyethers, polyols, surfactants, and foaming agents, as well as prepared prepolymer mixtures containing these compounds. Since it is often difficult to ascertain the exact composition of these commercial compositions, the examples have been limited to the use of definitely identified materials.

The exact proportions of reactants necessary to produce the flame resistant reaction products are not too critical. Stoichiometric quantities can be readily calculated from the hydroxyl number of the polyol (or the amount of active hydrogen in the case of amino or carboxy groups) and the number of —NCO groups in the isocyanate. Generally speaking, however, an excess of isocyanate of 5–15% of the stoichiometric amount is used.

We find that it is necessary to add from 1–4% P, preferably about 3% P in the form of the O,O-dihydrocarbyl N,N-bis-(hydroxyalkyl) phosphoramidate in order to provide satisfactory flame resistance.

We have found it desirable in some cases to form a prepolymer by first reacting the TDI with sufficient polyester or polyol to reduce the amount of the remaining —NCO groups to about 30–35% of the weight of the prepolymer. Since TDI has a normal —NCO content of about 48%, the formation of the prepolymer results in reducing the —NCO content by about 25%. This is primarily a process expedient, however, and is not necessary to the practice of the invention.

The foregoing detailed description is given for clearness of understanding only and no unnecessary limitations should be derived therefrom.

What is claimed is:

1. A flame resistant polyester resin comprising the reaction product of an aliphatic unsaturated polycarboxylic acid and an O,O-dihydrocarbyl N,N-bis-(hydroxyalkyl) phosphoramidate having the formula:

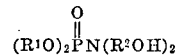

wherein $R^1$ is a hydrocarbyl radical selected from the class consisting of alkyl and aryl, and $R^2$ is a lower alkylene radical.

2. The flame resistant reaction product of claim 1 wherein the phosphoramidate is present in an amount sufficient to provide between about 1 and 4% by weight phosphorus.

3. The flame resistant reaction product of claim 1 in which said phosphoramidate comprises O,O-diethyl N,N-bis-(2-hydroxyethyl) phosphoramidate in an amount sufficient to provide at least about 3% by weight phosphorus in the said product.

4. A flame resistant polyester resin comprising the reaction product of an aliphatically unsaturated polybasic carboxylic acid, an O,O-dihydrocarbyl N,N-bis-(hydroxyalkyl) phosphoramidate having the formula:

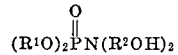

wherein $R^1$ is a hydrocarbyl radical selected from the class consisting of alkyl and aryl, and $R^2$ is a lower alkylene radical, and an aliphatically unsaturated hydrocarbon cross-linking agent.

References Cited

UNITED STATES PATENTS

| | | | |
|---|---|---|---|
| 2,666,750 | 1/1954 | Dickey et al. | 260—2 |
| 3,076,010 | 1/1963 | Beck et al. | 260—461 |
| 3,134,742 | 5/1964 | Wismer et al. | 260—461 |
| 3,159,605 | 12/1964 | Friedman | 260—77.5 |
| 3,175,001 | 3/1965 | Holtschmidt | 260—77.5 |
| 3,235,517 | 2/1966 | Beck et al. | 260—2.5 |

FOREIGN PATENTS

| | | |
|---|---|---|
| 821,342 | 10/1959 | Great Britain. |
| 973,578 | 10/1964 | Great Britain. |

WILLIAM H. SHORT, *Primary Examiner.*

LOUISE P. QUAST, *Assistant Examiner.*

U.S. Cl. X.R.

260—2.5, 77.5, 870, 953

U.S. DEPARTMENT OF COMMERCE
PATENT OFFICE
Washington, D.C. 20231

UNITED STATES PATENT OFFICE
CERTIFICATE OF CORRECTION

Patent No. 3,440,222                              April 22, 1969

Edward N. Walsh et al.

It is certified that error appears in the above identified patent and that said Letters Patent are hereby corrected as shown below:

Column 1, line 68, "hydroyzed" should read -- hydrolyzed --. Column 2, line 10, "of" should read -- or --; line 18, "OH)$^2$" should read -- OH)$_2$ --; line 19, "Base·HC" should read -- Base·HCl --; line 20, "Base·HC" should read -- Base·HCl --. Column 3, line 24, "0° C." should read -- 10° C. --. Column 6, line 20, "3.75" should read -- 3.74 --. Column 7, line 37, "phosphates" should read -- phosphites --.

Signed and sealed this 7th day of April 1970.

(SEAL)
Attest:

Edward M. Fletcher, Jr.                          WILLIAM E. SCHUYLER, JR.
Attesting Officer                                 Commissioner of Patents